United States Patent [19]

Freitag

[11] 4,341,295
[45] Jul. 27, 1982

[54] SYNCHRONIZING DEVICE

[75] Inventor: Manfred Freitag, Friedrichshafen, Fed. Rep. of Germany

[73] Assignee: Zahnradfabrik Friedrichshafen A.G., Friedrichshafen, Fed. Rep. of Germany

[21] Appl. No.: 152,158

[22] Filed: May 22, 1980

[30] Foreign Application Priority Data

May 23, 1979 [DE] Fed. Rep. of Germany ....... 2920970

[51] Int. Cl.³ .............................................. F16D 23/04
[52] U.S. Cl. .................................................. 192/53 E
[58] Field of Search .............. 192/53 E, 53 G; 74/339

[56] References Cited

U.S. PATENT DOCUMENTS

| 1,730,362 | 10/1929 | Gaylord | 192/53 G |
| 2,271,571 | 2/1942 | Peterson | 192/53 E |
| 2,399,569 | 4/1946 | Peterson et al. | 192/53 E |

FOREIGN PATENT DOCUMENTS 885354 8/1953 Fed. Rep. of Germany .
2538782 10/1977 Fed. Rep. of Germany .

Primary Examiner—Allan D. Herrmann
Attorney, Agent, or Firm—Lyon & Lyon

[57] ABSTRACT

A synchronizing device, particularly for automobile gear units with an axially slidable sleeve. Rams pass axially through the sleeve and there are means in the sleeve for limiting the shifting power. There is a transversely directed hole in the sleeve with pressure pieces at each end for contacting the rams, and a spring in the hole urges the pressure pieces outwardly to limit the ram movement. There can be several transverse holes arranged in a polygon about the sleeve.

28 Claims, 14 Drawing Figures

SYNCHRONIZING DEVICE

BACKGROUND

This invention relates to a synchronizing device. In particular, the device is for use with automobile gear units, in which a shift sleeve is axially slidable along rams passing through the sleeve on an axis parallel to the sleeve. The ram ends in each case are fixed to a synchronizing ring, and means for limiting the shifting power is provided in the shift sleeve.

In standard synchronizing devices, the ram has a groove-shaped ring recess, into which at least one pressure piece, prestressed by a spring, meshes concentrically. The spring tension is designed so that the sliding sleeve must be displaced with a certain power in order to press the pressure piece through the ram into the sleeve body. If, then, the sliding sleeve is displaced axially with a certain power, then, at first, the entire assembly, consisting of the synchronizing ring, the rams and the sliding sleeve, is moved onto the assembly to be coupled. The corresponding synchronizing coupling is thereby engaged. It is not until after a pre-determined shifting power has been attained, which is adjusted so that the desired synchronizing is simultaneously attained, that the power limit on the ram is overcome and the sliding sleeve can again be displaced axially to thereby close the tooth or dog-clutch coupling.

In most of the standard synchronizing devices a pressure piece is attached in each case to a ram and, in turn, a pressure spring is attached to the pressure piece. The arrangement of pressure spring and pressure piece with regard to the ram is made in different variations. It is standard to provide spring and pressure pieces in a bored hole disposed radially in the sliding sleeve. However, in order to attain a corresponding spring tension, a large sliding sleeve is required. In addition it is standard to arrange the pressure pieces and the springs with their bored holes tangential to the circumferential direction of the sliding sleeve, so that, in order to get a higher locking power, two interlocking springs are used. Also, in order to be able to insert longer springs, the bored hole axis is shifted further inwardly from its tangential direction into the sleeve interior. The pressure pieces, however, are always arranged so that they act concentricly to the arm center.

It is known from DE-PS No. 885 354 that it is also possible to attach, in each cae, two pressure pieces which lie on the same axis to a ram. This is essentially tangential to their axes and passes through the ram center point, so that each ram is attached to its own pressure spring, which in turn is supported on the sleeve through screw-rams. Doubling the power is effected by a double arrangement wherein two pressure pieces and two springs are used.

In these standard synchronizing devices, in order to attain certain locking powers, many springs are needed. This in turn requires many bored holes, many parts, many working procedures, and much assembly time. The device is also of a higher weight, occupies larger construction space and provides correspondingly less reliability. The radial spring arrangement results in corresponding problems with large shaft diameters and small hub diameters. The plurality of springs and pressure pieces necessary for increased locking power causes a corresponding weakening of the sliding sleeve cross section and also a critical load of the springs. As a result there is a higher risk of breakage, in particular, in emergency situations and with large couplings.

It is an object of the invention to provide a synchronizing device in which, in a simple manner, a substantial increase in the locking power limit is obtained by using as few components and as simple an arrangement as possible. It is a further object to provide a device which is easily manufactured, has reduced weight and occupies reduced space and has a reduction in the installation time. In addition, the risk of breakage in emergency situations and in large couplings is also sought to be minimized.

SUMMARY OF THE INVENTION

According to the invention there is provided a shift sleeve adapted to be mounted about a shaft. The shift sleeve includes at least one hole transversely directed at least partially through the sleeve. There are at least two substantially parallel holes in an axial direction through the sleeve with a ram located in each of the holes. Also there are at least two pressure pieces in the transversely directed hole, one at each end of the hole, with a pressure spring disposed in the hole between the pieces and essentially perpendicular to the rams. The pressure pieces mesh with mating formations in the rams thereby to limit the shift of the sleeve.

The synchronizing device provides two pressure pieces which mesh on different rams. These pressure pieces, however, are prestressed via a single pressure spring. Each pressure spring is consequently supported on both sides on one pressure piece which, in practice, amounts to substantially a double utilization of the spring tension. Also in the same bored hole leading from ram to ram there are in each case two pressure pieces with one spring between them, a great advantage in regard to working procedures.

The pressure pieces, pressure spring, bored holes can also have a certain axial displacement relative to the ram axes, so that, among others, a parallel axis displacement or also an angular displacement can be provided. With a parallel axis displacement, the axis of the bored hole (pressure pieces and spring) is displaced equally by the same amount on both accompanying ram axes, while with the angular displacement the bored hole axis intersects the one ram axis, while it is displaced outwardly by a corresponding amount to the axis of the other ram.

The axis displacement creates an eccentric meshing of the pressure pieces on the ram circumference so that there is an increased clamping effect as well as a certain compensation in the event of production defects. In addition, the axis displacement of the bored holes also has the advantage that in the radial direction, viewed inwardly, a greater space is available. Also, pressure springs and pressure pieces of greater diameters can be used, which in turn contributes to a power increase, since there is a significantly greater ram circumference sector between them through the outward shift.

If a particularly high locking power limit is needed in a synchronizing coupling, then, in an axial direction, two or more such power limit polygons can be arranged in the shift sleeve.

There is the possibility of staggering these power limit polygons so that each polygon has a corresponding number of rams, and the number of rams is multiplied correspondingly. Also, there is the possibility of arranging the polygons exactly symmetrically, so that each polygon always has the same ram as a joint.

Through this the number of components is correspondingly reduced.

The pressure pieces can be formed in many different ways: for instance, bearings can be used, or sleeves whose operative end has a rounded-off formation corresponding to the ram groove, while at its other, open end a spring is supported in each case. Additionally, pressure pieces on their one end can be rounded-off cylinder pins, or also have a mushroom-shaped formation so that the head ends are formed conically or also saddle-roof shaped. Corresponding to the base of the ram groove they are rounded off, while the shaft of these pressure pieces serves as spring guide.

The ram has preferably a round cross section, but this can also be formed as a rectangle or square.

The ram groove here can be a transverse recess that is tangential or parallel to the side, which is housed on the circumference of the ram and corresponds to the expected pressure direction of the pressure piece.

In addition, the ram groove can be a circular, ring-shaped recess with a formation which is essentially V-shaped or U-shaped so that the position of the arms is adapted to the specific application, and with which the corners or edges are correspondingly rounded off. This permits a particularly gentle shifting and a particular reduction of abrasion of the ram.

DRAWINGS

The invention is further described with reference to the accompanying drawings which are:

DETAILED DESCRIPTION OF DRAWINGS

Figure 1:
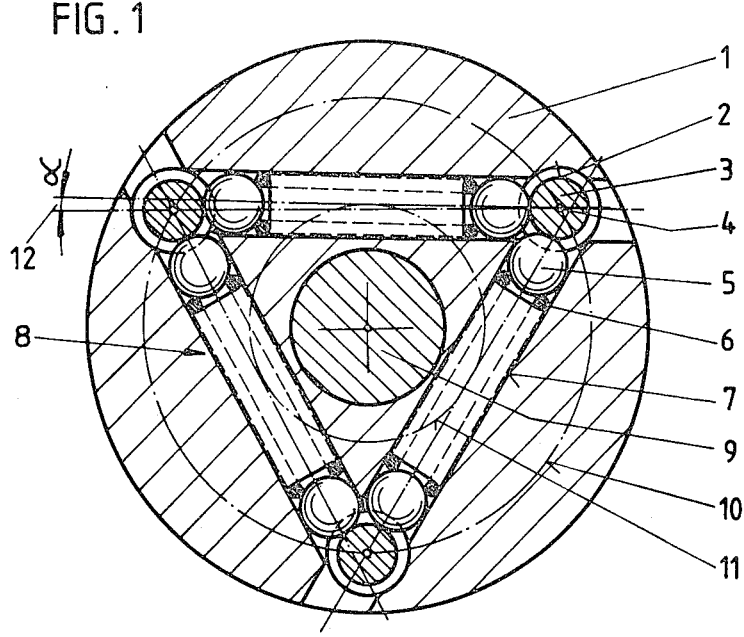
FIG. 1 is a cross sectional view through a synchronizing triangular arrangement having an angular displacement.

An entire synchronizing unit is not shown in the drawings, but instead only the relevant portion which illustrates the invented synchronizing device.

Figures 13, 14:
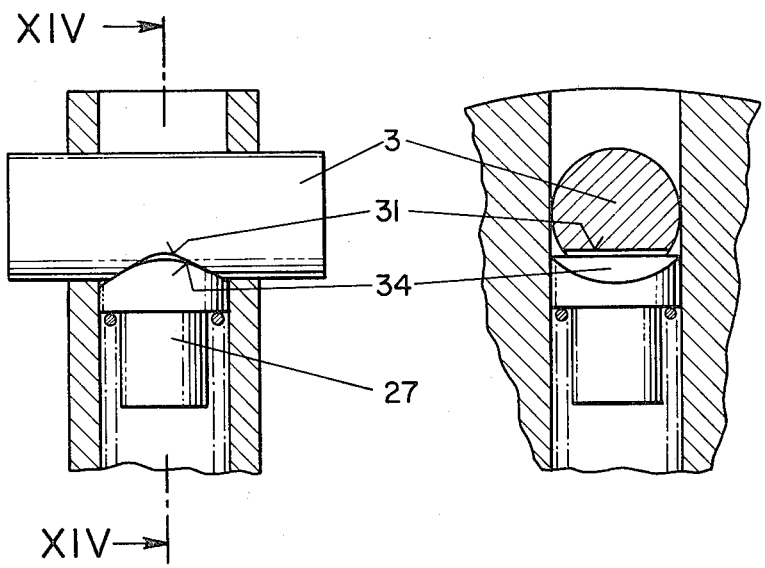
FIG. 13 is a partial, axial cross sectional view similar to FIG. 6, illustrating a mushroom-shaped pressure piece with a saddle-roof shaped head end.
FIG. 14 is a section along lines XIV—XIV of the embodiment of FIG. 13.

There is a shift sleeve 1 on a shaft 9, which in accordance with conventional constructions is axially slidable, but non-rotatable. Rams 3 arranged about a dividing circle 10 pass through the shift sleeve 1 axially so as to permit axial shiftability of the shift sleeve. Concentrically about the dividing circle 10 of the rams 3 there are provided bored holes 7 arranged about a dividing circle 11 and at the same time tangentially to this dividing circle 11. In each of these bored holes 7 there is a pressure spring 6 which is supported on both sides on one pressure piece 5 each. The pressure pieces 5 in turn mesh in ring-shaped formations, being grooves 2 or tangential grooves 31 (as shown in FIGS. 13 or 14) of the rams 3. The bored holes 7 in each case constitute a triangular arrangement 8 so that the joints at the points of intersection of the sides of the triangle are at the rams 3.

The axes of the bored holes 7, which at the same time are the axes of the pressure springs 6 and of the pressure pieces 5, can be concentrically arranged, namely, in each case to pass through the ram axes 4 on both sides. Alternatively, these axes of 5, 6 and 7 can also manifest a displacement relative thereto, thus not intersecting the ram axis 4. There can be an angular displacement 12 such that the one end of the axis intersects the ram axis 4, while on the other side the axis of the bored hole does not intersect the ram axis, but rather runs outwardly from the ram axis 4 at a certain distance as indicated in FIG. 1 by angle $\gamma$.

Figure 2:
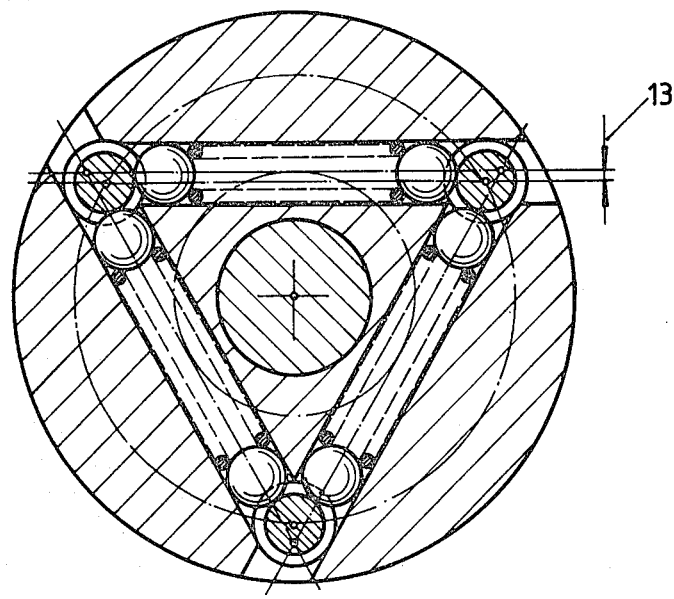
FIG. 2 is a cross sectional view similar to FIG. 1, with a triangular arrangement with a slight, parallel axis displacement.
Figure 3:
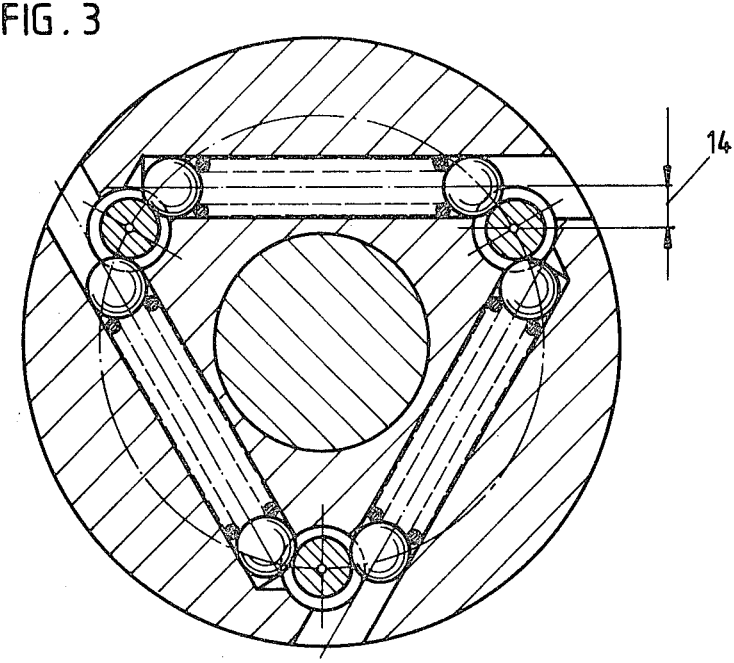
FIG. 3 is a cross sectional view similar to FIG. 1, with a triangular arrangement with a relatively large axis of displacement.

As can be seen from FIGS. 2 and 3, this displacement can be an outward, parallel displacement relative to the bored holes 7. The axes of the bored hole are displaced relatively outwardly of the axes of the two rams in question, in each case by the same amount. This displacement can be a relatively small parallel displacement 13 as indicated in FIG. 3, or it can be, if necessary, a significantly larger parallel displacement 14 as indicated in FIG. 4.

Figure 4:
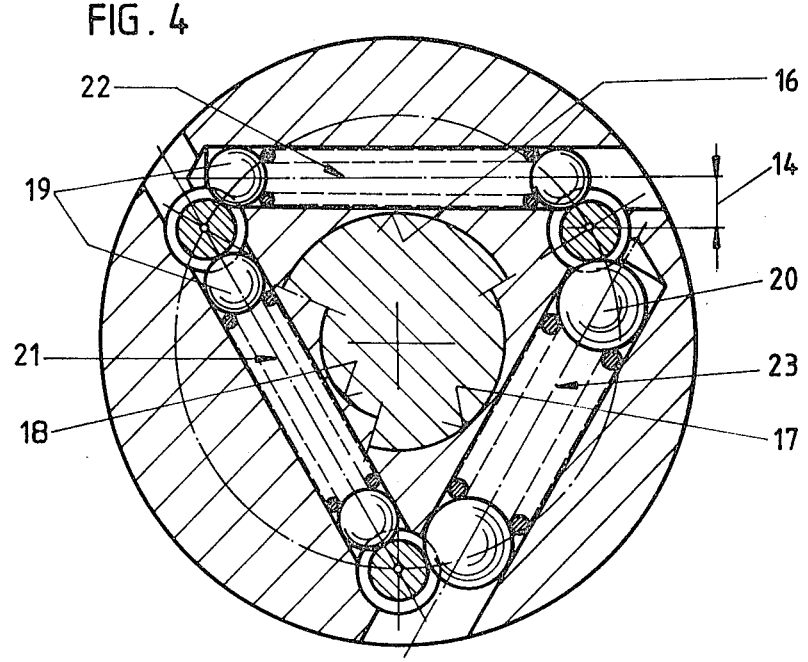
FIG. 4 is a cross sectional view similar to FIG. 1, illustrating different embodiments having different triangular arrangements showing different sizes of the pressure pieces, springs and shafts.

In FIG. 4 there are depicted, in cross section, three different embodiments from which a direct comparison can be made. Arrangement 21 shows an embodiment with pressure pieces 19 which act exactly concentrically. It can be seen that this arrangement 21 permits a relatively smaller relative diameter shaft 18. By using pressure pieces 19 of the same size the bored hole 7 is arranged as indicated by arrangement 22 with a relatively large axis displacement 14. A shaft 16 with a significantly larger shaft diameter can be built into the same shift sleeve. There is, however, the possibility of providing another arrangement 23 with the same axis displacement. Here the diameter of the bored hole 7 is corresponding larger, and thus larger pressure pieces 20 as well as pressure springs with larger diameters can be used. In spite of this correspondingly larger dimensioning, a medium diameter shaft 17 can still be used. The shaft 17 is of larger diameter than the diameter of shaft 18 with a concentric arrangement with small pressure pieces 19.

Figure 5:
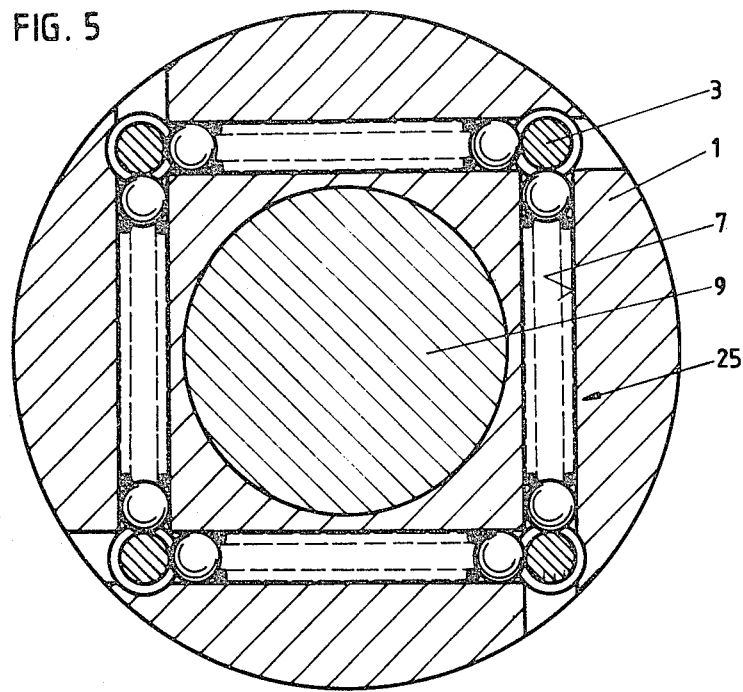
FIG. 5 is a cross sectional view through a synchronizing device having a square arrangement with a phantom arrangement.

The bored holes 7 can be arranged in the shift sleeve 1 as illustrated in FIG. 5 in the form of a polygon around the shaft 9, so that at all of the points of intersection of the sides, at the joints, of this polygon arrangement 25, there is a ram 3.

In FIGS. 6, 7, 8, 13 and 14, four other embodiments of the pressure pieces 5 are shown. From FIG. 6 it can be seen that the pressure piece is a bearing 26, which is arranged in a bored hole 7 perpendicular to the ram axis 4, so that the pressure spring 6 is supported on its circumference. The bearing 26 here meshes into the correspondingly form ring groove 2 of the ram 3.

Figures 6, 7, 8:
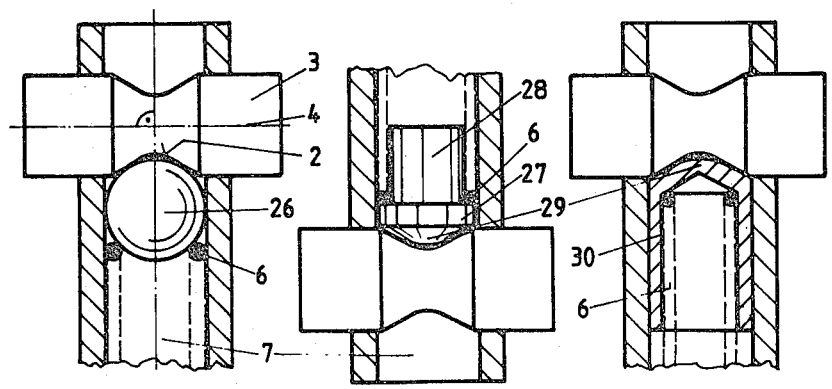
FIG. 6 is a partial, axial cross sectional view showing an embodiment of the pressure piece as a bearing.
FIG. 7 is a partial, axial cross sectional view, similar to FIG. 6, showing an embodiment with a mushroom-shaped pressure piece with conical head end.
FIG. 8 is a partial, axial cross sectional view similar to FIG. 6, showing an embodiment with a sleeve-shaped pressure piece.

In FIGS. 7, 13 and 14, there are shown mushroom-shaped pressure pieces 27 whose head ends are either conical ends 29 as in FIG. 7, or saddle-roof shaped ends 34 as in FIGS. 13 and 14. The ends 29 and 34 have a formation which is rounded off to correspond with the ram formation 2 or 31, as the case may be, while the shaft 28 of the pressure pieces simultaneously serves as a guide for the spring 6.

In FIG. 8 the pressure piece is in the form of a sleeve 30, and the conical end 29 of the sleeve 30 provides a formation rounded off to correspond to the ram groove formations 2. Spring 6 is simultaneously supported and axially guided into an opening at the opposite end of the sleeve 6.

Figure 9:
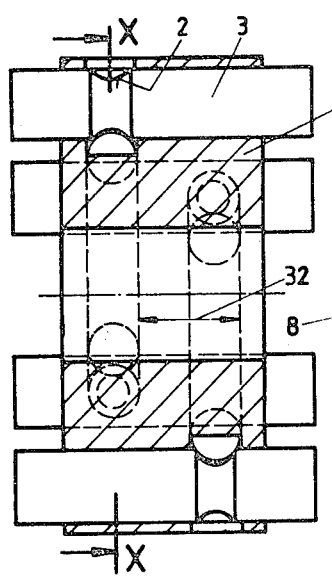
FIG. 9 is a cross sectional side view of a second embodiment of the device along lines IX—IX of FIG. 10.
Figure 10:
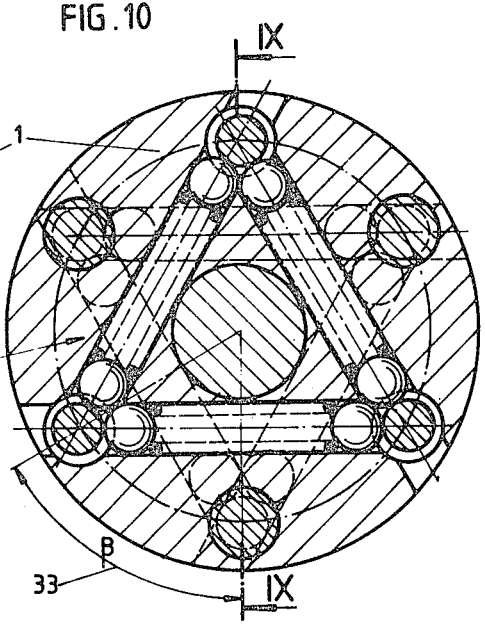
FIG. 10 is a cross sectional end view along lines X—X of FIG. 9.

As is illustrated in FIGS. 9–12, the invented arrangement, here shown in the triangular arrangement 8, can be repeated axially in the shift sleeve 7, in each case there being an axial displacement 32 between the arrangements 8. As shown in FIGS. 9 and 10, there are two triangular arrangements 8 having an angular displacement 33 which is effectively a tangential displacement $\beta$ so that viewed axially there is a star-shaped arrangement. All the elements of each triangular arrangement 8 are used in each axial arrangement number, so that in the example shown there are a total of six rams.

Figure 11:
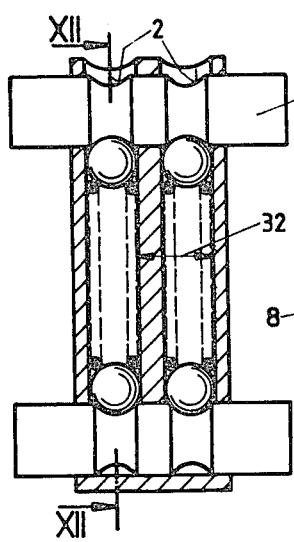
FIG. 11 is a cross sectional side view of a third embodiment of the device along lines XI—XI of FIG. 10.
Figure 12:
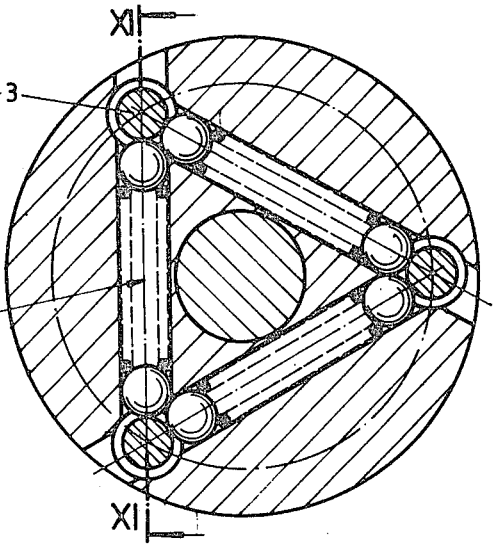
FIG. 12 is a cross sectional end view along lines XII—XII of FIG. 11.

In FIGS. 11 and 12, the triangular arrangement 8 viewed in an axial direction is exactly equally aligned behind each other, so that the three rams 3 will be at the points of intersection of the sides of the triangular arrangements 8. Each ram 3 is equipped with as many formation grooves 2 or formation grooves 31 (these being a double arrangement as shown in FIG. 11) as there are triangular arrangements 8 provided in the axial direction. Through this arrangement material, rams and labor are saved and at the same time fewer bored holes are needed in the sleeve.

The rams 3, in addition to the manner illustrated in the drawings in groups of threes or fours, can, if necessary, also be arranged in other numbers of groups, for instance, five, six and more about the circle. It is also conceivable that all the rams need not be arranged on the same circle, but rather some of the rams may be provided symmetrically or, if necessary, some of the rams may be on another concentric circle.

It is particularly advantageous in the invention that at least three pressure springs 6 are arranged essentially tangentially to a dividing circle and concentrically to the sleeve axis. In addition the rams 3 are also arranged on a dividing circle concentrically to the pressure-spring dividing circle, so that the number of rams 3 is equal to the number of pressure springs.

The holes for the springs and the pressure pieces 5 are arranged in the sleeve body so that in each case the axis of one of the holes intersects with the axes of each of two rams 3, so that the pressure pieces 5 act exactly concentrically on the rams. Through this, when using three rams, an exact triangular arrangement is formed.

The number of the rams arranged on the dividing circle can be selected as necessary, provided, however, there are two rams 3 for two pressure pieces 5 with a single pressure spring 6 between them. Through this symmetrical arrangement, considered in cross section, there is a polygonal arrangement of limiting the locking power, and these polygons can be designated as power limit polygons.

The present embodiments of the invention are to be considered in all aspects as illustrative and not restrictive to the scope of the invention.

I claim:

1. A synchronizing device comprising a shift sleeve adapted to be mounted about a shaft, the shift sleeve including at least one hole transversely directed at least partially through the sleeve, and at least two substantially parallel holes in an axial direction through the sleeve, a ram being located in each of the axially directed holes in the shift sleeve, at least two pressure pieces in the transversely directed hole, one at each end of the hole, a pressure spring disposed in the hole between the pressure pieces and being substantially perpendicular to the rams, the pressure pieces meshing with a mating formation in the rams, thereby to limit the shift of the shift sleeve.

2. A synchronizing device according to claim 1 wherein there are a plurality of transversely directed holes, the holes being directed relative to each other to form a polygon and being arranged substantially tangentially to a dividing circle concentric to the sleeve axis, there being a pressure spring in each hole.

3. A synchronizing device according to claim 2 wherein there are several rams, the rams being arranged on a dividing circle concentrically to the pressure-spring dividing circle and being located at points of intersection of the transversely directly holes.

4. A synchronizing device according to claim 1 wherein the pressure pieces are bearings.

5. A synchronizing device according to claim 1 wherein the pressure pieces are sleeves with closed ends, the ends having formations mating with the ram formation, and the ends of the springs being supported in the sleeves.

6. A synchronizing device according to claim 1 wherein the pressure pieces are cylinder pin formations mating with the ram formations.

7. A synchronizing device according to claim 1 wherein the pressure pieces have mushroom-shaped formations, the head ends of the formations mating with the ram formations and the shafts of the formations acting as spring guides.

8. A synchronizing device according to claim 1 wherein the axis of the spring and the respective pressure pieces intersect with the ram axes such that the pressure pieces act concentrically with the rams.

9. A synchronizing device according to claim 1 wherein there is a displacement between the axis of the pressure spring and the axes of the rams, the displacement between the axes being parallel.

10. A synchronizing device according to claim 1 wherein there is an angular displacement between the axis of the pressure spring and the axes of the rams such that the one pressure piece on which a piece is supported acts concentrically with the one ram and the other pressure piece acts eccentrically with the second ram.

11. A synchronizing device according to either claim 2 or 3 wherein there is more than one polygon shaped arrangement, the polygon shaped arrangement being spaced axially relative to each other along the shift sleeve.

12. A synchronizing device according to claim 11 wherein the pressure pieces are bearings.

13. A synchronizing device according to claim 11 wherein the polygons are angularly displaced relative to each other, such that the quantity of rams is correspondingly increased.

14. A synchronizing device according to claim 13 wherein the pressure pieces are bearings.

15. A synchronizing device according to claim 11 wherein polygons have the same alignment, such that the quantity of rams remains the same, and the quantity of grooves in the axial direction increases in proportion to the quantity of polygons.

16. A synchronizing device according to claim 15 wherein the pressure pieces are bearings.

17. A synchronizing device according to claim 1 wherein the ram has a circular cross section.

18. A synchronizing device according to claim 1 wherein the ram has a rectangular cross section.

19. A synchronizing device according to claim 1 wherein the mating formation in the ram is a continuous recess in the sides of the ram.

20. A synchronizing device according to claim 1 wherein the mating formation in the ram is a circular, ring-shaped recess being essentially V-shaped.

21. A synchronizing device according to claim 1 wherein the mating formation is a circular, ring-shaped recess being essentially U-shaped.

22. A synchronizing device according to any one of claims 5, 6 or 7 wherein the formations of the pressure pieces are substantially conical.

23. A synchronizing device according to any one of claims 5, 6 or 7 wherein the formations of the pressure pieces are a saddle-roof-shaped.

24. A synchronizing device comprising a shift sleeve adapted to be mounted about a shaft, the shift sleeve including at least three holes transversely directed at least partially through the sleeve to form a polygon shape, and arranged substantially concentrically about the sleeve axis, a pressure spring in each hole, and pressure pieces at the ends of the spring, at least three axially directed holes in the shift sleeve, and axially directed rams located in the axially directed holes, each axially directed hole being located substantially at each point of intersection of the axes of the transversely directed holes such that the respective axially directed hole communicates with those transversely directed holes at the points of intersection, and the ram located in the axial hole being adapted to contact the pressure pieces in the holes leading to the respective points of intersection.

25. A synchronizing device as claimed in claim 24 wherein the pressure pieces have formations adapted for contacting the rams, these being mating formations in the rams.

26. A synchronizing device as calimed in claim 25 including a plurality of holes arranged in polygon shapes, each of the polygons being axially displaced along the sleeve.

27. A synchronizing device as claimed in claim 26 wherein the polygons are angularly displaced relative to each other.

28. A synchronizing device for a gear unit including a shift sleeve, openings in the shift sleeve, axially parallel directed rams passing through said openings in the shift sleeve, pressure pieces in the shift sleeve, groove means between the pressure pieces and the rams, at least two of said pressure pieces being adapted to mesh in respective groove means, at least two spring means in the shift sleeve, both the spring means being adapted to prestress the pressure pieces, bores in the shift sleeve substantially perpendicular to each of the rams, the pressure pieces being guided within the bores, and wherein each one of said respective pressure pieces mesh with different rams and are prestressed by a single pressure spring.

* * * * *